US010593020B2

(12) United States Patent
Gu et al.

(10) Patent No.: US 10,593,020 B2
(45) Date of Patent: Mar. 17, 2020

(54) UNSUPERVISED LEARNING APPROACH FOR VIDEO DEBLURRING

(71) Applicant: NVIDIA Corp., Santa Clara, CA (US)

(72) Inventors: Jinwei Gu, San Jose, CA (US); Orazio Gallo, Santa Cruz, CA (US); Ming-Yu Liu, San Jose, CA (US); Jan Kautz, Lexington, MA (US); Huaijin Chen, Houston, TX (US)

(73) Assignee: NVIDIA Corp., Santa Clara, CA (US)

( * ) Notice: Subject to any disclaimer, the term of this patent is extended or adjusted under 35 U.S.C. 154(b) by 185 days.

(21) Appl. No.: 15/887,907

(22) Filed: Feb. 2, 2018

(65) Prior Publication Data

US 2019/0244331 A1 Aug. 8, 2019

(51) Int. Cl.
| G06K 9/00 | (2006.01) |
| G06T 5/00 | (2006.01) |
| G06N 3/08 | (2006.01) |
| G06K 9/66 | (2006.01) |
| G06K 9/46 | (2006.01) |
| G06K 9/62 | (2006.01) |

(52) U.S. Cl.
CPC ............ G06T 5/003 (2013.01); G06K 9/4604 (2013.01); G06K 9/6271 (2013.01); G06K 9/66 (2013.01); G06N 3/08 (2013.01)

(58) Field of Classification Search
CPC ........ G06K 9/4604; G06K 9/66; G06T 5/003; G06N 3/08
See application file for complete search history.

(56) References Cited

U.S. PATENT DOCUMENTS

| 2011/0019909 A1* | 1/2011 | Farid | G06K 9/6234 |
| | | | 382/160 |
| 2013/0304682 A1* | 11/2013 | Byrne | G06N 3/084 |
| | | | 706/19 |
| 2014/0023291 A1* | 1/2014 | Lin | G06T 5/003 |
| | | | 382/279 |
| 2015/0063695 A1* | 3/2015 | Pulli | G06T 5/003 |
| | | | 382/173 |
| 2018/0121767 A1* | 5/2018 | Wang | G06N 3/04 |
| 2018/0276796 A1* | 9/2018 | Wang | G06T 5/003 |

OTHER PUBLICATIONS

Tae Hyun Kim, (Generalized video deblurring for dynamic scenes, IEEE , pp. 4526-5432 (Year: 2015).*

Y.T. Zhou et al ("Computation of Optical Flow Using a Neural Network", IEEE, pp. 71-78) (Year: 1998).*

(Continued)

Primary Examiner — Amara Abdi
(74) Attorney, Agent, or Firm — Rowan Tels LLC

(57) ABSTRACT

An image processing method extracts consecutive input blurry frames from a video, and generates sharp frames corresponding to the input blurry frames. An optical flow is determined between the sharp frames, and the optical flow is used to compute a per-pixel blur kernel. The blur kernel is used to reblur each of the sharp frames into a corresponding re-blurred frame. The re-blurred frame is used to fine-tune the deblur network by minimizing the distance between the re-blurred frame and the input blurry frame.

20 Claims, 4 Drawing Sheets

(56) References Cited

OTHER PUBLICATIONS

Alexey et al (FlowNet: Learning Optical Flow with Convolutional Networks, 2015 IEEE International Conference on Computer Vision, pp. 2758-2768, IEEE) (Year: 2015).*
Tae Hyun Kim and Kyoung Mu Lee. Generalized video deblurring for dynamic scenes. In Proceedings of the IEEE Conference on Computer Vision and Pattern Recognition, pp. 5426-5434, 2015.
Orest Kupyn, Volodymyr Budzan, Mykola Mykhailych, Dmytro Mishkin, and Jiri Matas. Deblurgan: Blind motion deblurring using conditional adversarial networks. arXiv preprint arXiv:1711.07064, 2017.
Seungjun Nah, Tae Hyun Kim, and Kyoung Mu Lee. Deep multi-scale convolutional neural network for dynamic scene deblurring. arXiv preprint arXiv:1612.02177, 2016. 2, 5, 6.
Shuochen Su, Mauricio Delbracio, Jue Wang, Guillermo Sapiro, Wolfgang Heidrich, and Oliver Wang. Deep video deblurring. arXiv preprint arXiv:1611.08387, 2016.

* cited by examiner

UNSUPERVISED LEARNING APPROACH FOR VIDEO DEBLURRING

BACKGROUND

Motion blur is a fundamental problem in computer vision as it impacts image quality and hinders inference. Conventional deblurring algorithms leverage the physics of the image formation model and use hand-crafted priors as reference points. Those algorithms usually produce results that accurately reflect the underlying scene, but present artifacts. Recent learning-based methods implicitly extract the distribution of natural images directly from the inputs and use it to synthesize plausible images. While those methods may sometimes produce impressively sharp outputs, they may not always faithfully reproduce the content of the latent image.

BRIEF SUMMARY

A method is disclosed to fine-tune deblurring neural networks in a self-supervised fashion by enforcing that the output sharp frames, when re-blurred based on the optical flow between subsequent frames, match the input blurry frames within a minimum error distance.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
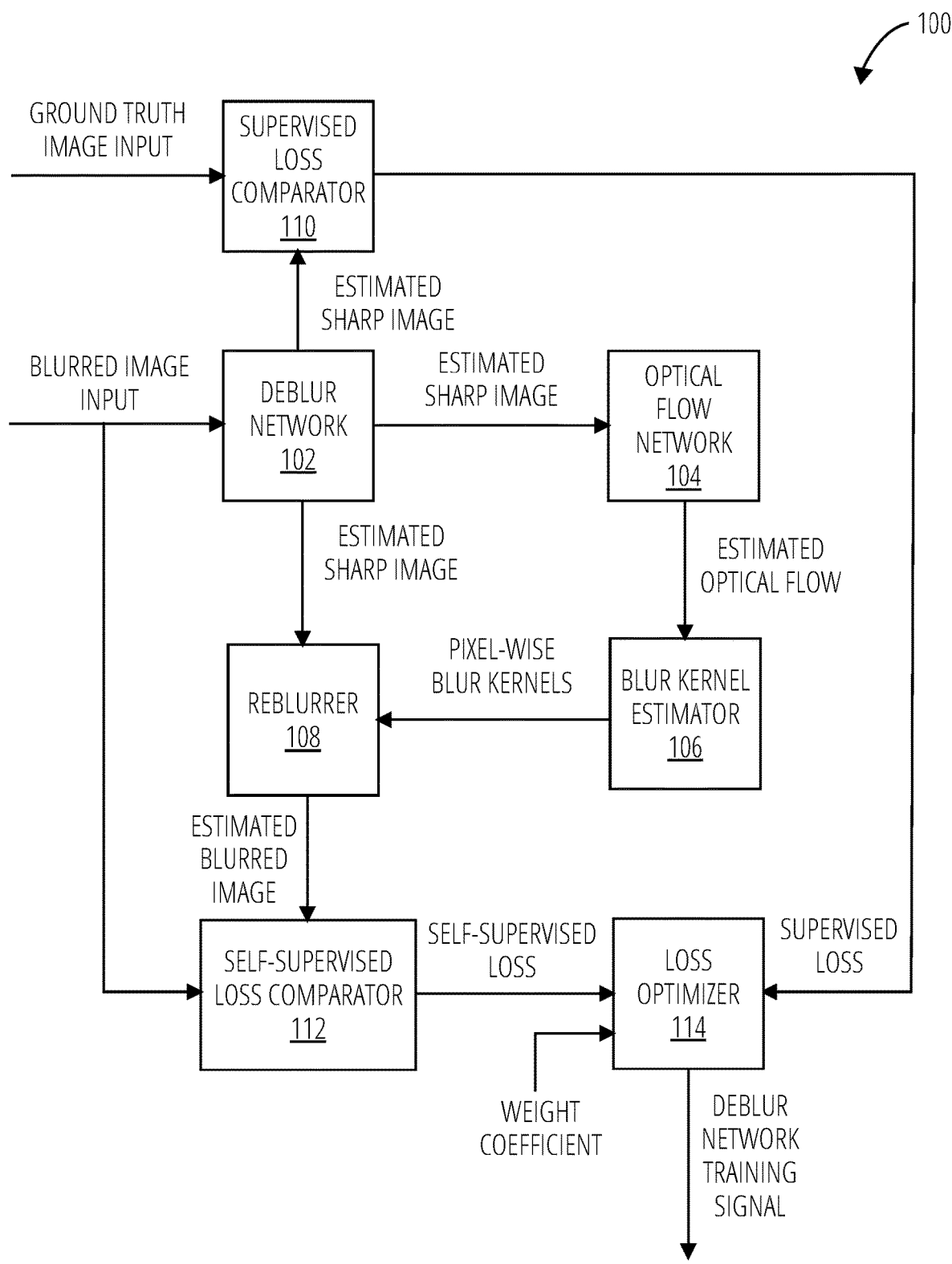
FIG. 1 illustrates an embodiment of a deblur training system 100.

Referring to FIG. 1, an image deblur training system 100 comprises a deblur network 102, an optical flow network 104, a blur kernel estimator 106, a reblur unit 108, a supervised loss comparator 110, a self-supervised loss comparator 112, and a loss optimizer 114.

The deblur network 102 receives a blurred image input. The deblur network 102 transforms the blurred image input into an estimated sharp image and sends the estimated sharp image to the optical flow network 104, the supervised loss comparator 110, and the self-supervised loss comparator 112.

The optical flow network 104 receives the estimated sharp images from the deblur network 102. The optical flow network 104 utilizes the estimated sharp images to determine an estimated optical flow and send the estimated optical flow to the blur kernel estimator 106.

The blur kernel estimator 106 receives the estimated optical flow from the optical flow network 104. The blur kernel estimator 106 generates pixel-wise blur kernels from the estimated optical flow and send the pixel-wise blur kernels to the reblur unit 108.

The reblur unit 108 receives the estimated sharp image from the deblur network 102 and the pixel-wise blur kernels from the blur kernel estimator 106. The reblur unit 108 generates an estimated blurred image from the estimated sharp image and the pixel-wise blur kernels and sends the estimate blurred image to the self-supervised loss comparator 112.

The supervised loss comparator 110 receives the ground truth image input and the estimated sharp image from the deblur network 102. The supervised loss comparator 110 compares the ground truth image input and the estimated sharp image to determine the supervised loss and sends the supervised loss to the loss optimizer 114.

The self-supervised loss comparator 112 receives the blurred image input and the estimated blurred image from the reblur unit 108. The self-supervised loss comparator 112 compares the blurred image input and the estimated blurred image to determine the self-supervised loss and sends the self-supervised loss to the loss optimizer 114.

The loss optimizer 114 receives the supervised loss from the supervised loss comparator 110 and the self-supervised loss from the self-supervised loss comparator 112. The loss optimizer 114 may also receive a weight coefficient to balance the supervised loss and the self-supervised loss. The loss optimizer 114 generates a deblur network training signal to alter the deblur network. The alteration may be utilized to minimize the hybrid loss of the balanced supervised and self-supervised loss. The deblur network training signal may alter the weights associated with the deblur network 102. The optical flow network 104 and the blur kernel estimator 106 may also be altered by the deblur network training signal.

In some embodiments, the supervised loss comparator 110 is not utilized. The loss optimizer 114 may receive the self-supervised loss and generate the deblur network training signal without the supervised loss, although better results may be achieved using both supervised and unsupervised loss for training the networks.

Figure 2:
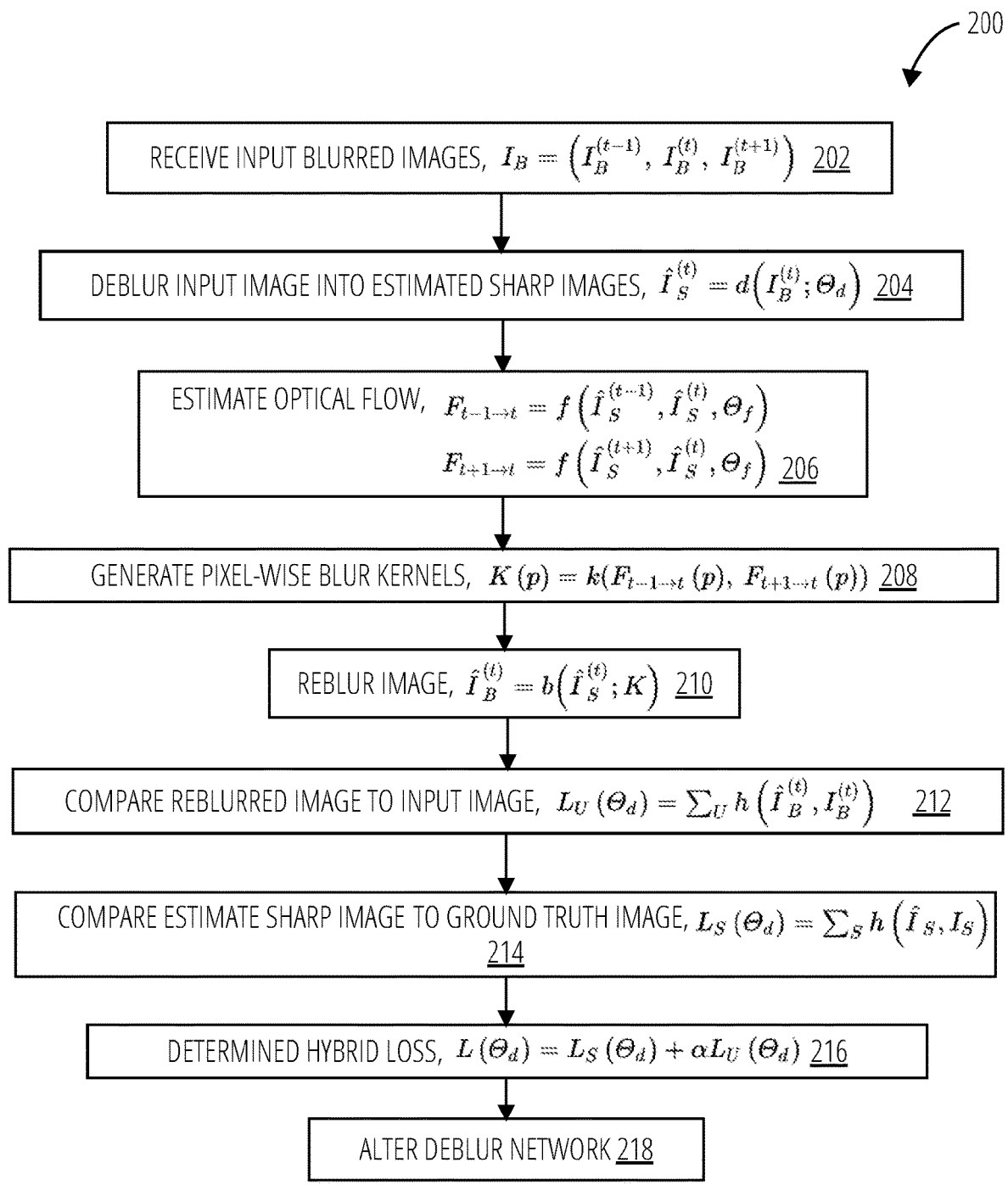
FIG. 2 illustrates an embodiment of a deblur training process 200.

The deblur training system 100 may be operated in accordance with the process depicted in FIG. 2. Referring to FIG. 2, a deblur training process 200 receives input blurred images (block 202). The input blurred images may comprise (for example) three consecutive images in time per Equation 1.

$$I_B = (I_B^{(t-1)}, I_B^{(t)}, I_B^{(t+1)}) \qquad \text{Equation 1}$$

The input blurred images are then deblurred into estimated sharp images (block 204). The deblur process may occur per Equation 2.

$$\hat{I}_S^{(t)} = d(I_B^{(t)}; \Theta_d) \qquad \text{Equation 2}$$

where $\Theta_d$ are the weights of the deblur network. A deblur network, such as DVD or DeblurGAN, may be utilized. Estimated sharp images may be produced for each of the three consecutive blurred image inputs.

The optical flow is then estimated (block 206). The optical flow may be estimated from the estimated sharp images for both the prior image to the current image and the following image to the current image per Equations 3 and 4, respectively.

$$F_{t-1 \to t} = f(\hat{I}_S^{(t-1)}, \hat{I}_S^{(t)}, \Theta_f) \qquad \text{Equation 3}$$

$$F_{t+1 \to t} = f(\hat{I}_S^{(t+1)}, \hat{I}_S^{(t)}, \Theta_f) \qquad \text{Equation 4}$$

where $\Theta_f$ are the weights of the optical flow network. An optical flow network, such as FlowNetS, may be utilized. The deblur network and the optical flow network may be considered two sub-networks of the same overall network, and the overall network is trained holistically, rather than training the two sub-networks separately.

The optical flows are then utilized to generate pixel-wise blur kernels (block 208) per Equation 5.

$$K(p)=k(F_{t-1 \to t}(p), F_{t+1 \to t}(p)) \qquad \text{Equation 5}$$

In preferred embodiments, Equation 5 is differentiable. The pixel-wise blur kernels may also be estimated utilizing the process depicted in FIG. 3, because such an estimation is differentiable and may, therefore, be trained in a neural network. An estimated blurred image is generated by utilizing the pixel-wise blur kernel to reblur the current sharp image (block 210) per Equation 6.

$$\hat{I}_B^{(t)} = b(\hat{I}_S^{(t)}; K) \qquad \text{Equation 6}$$

A distance function, such as the mean-square error (MSE), is used to compare the estimated blurred image to the input blurred image, and a loss is determined (block 212) per Equation 7.

$$L_U(\Theta_d) = \Sigma_U h(\hat{I}_B^{(t)}, I_B^{(t)}) \qquad \text{Equation 7}$$

where $$U = \{I_B^{(t)}\}$$

A distance function, such as MSE, is used to compare the estimated sharp image to the ground truth image and a loss is determined (block 214) per Equation 8.

$$L_S(\Theta_d) = \Sigma_S h(\hat{I}_S, I_S) \qquad \text{Equation 8}$$

where $$S = \{I_B; I_S\}$$

A hybrid loss is determined (block 216) per Equation 9.

$$L(\Theta_d) = L_S(\Theta_d) + \alpha L_U(\Theta_d) \qquad \text{Equation 9}$$

A weight coefficient, α, may be received to balance the contribution of the losses. The weight coefficient may be set to 0.1. The determined loss then alters the deblur network, d (block 218). The deblur network, or the weights of the deblur network, may be altered utilizing this process until the loss is minimized.

In some embodiments, the loss determined by comparing estimated sharp image to the ground truth image is not utilized to train the deblur network.

Figure 3:
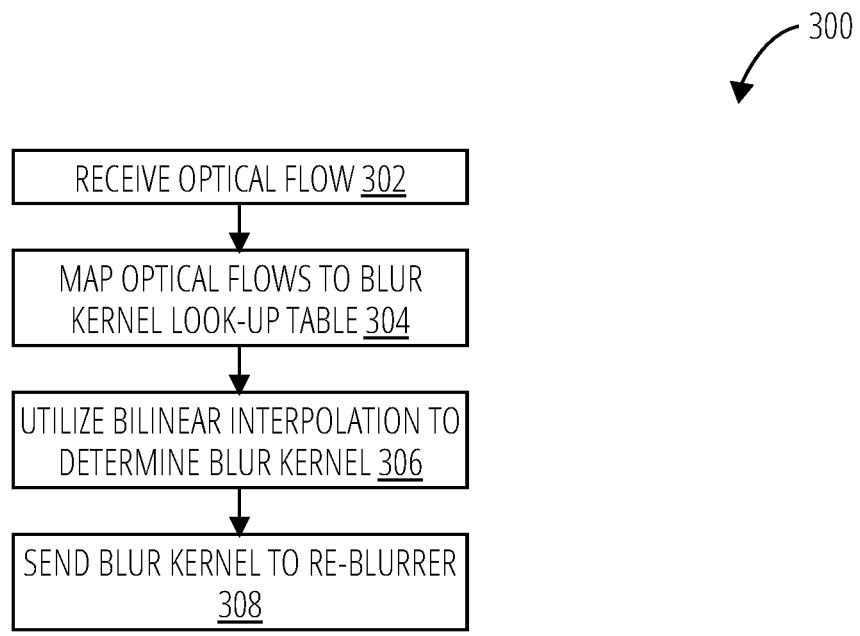
FIG. 3 illustrates an embodiment of a pixel-wise blur kernel estimation process 300.

Referring to FIG. 3, a pixel-wise blur kernel estimation process 300 receives an optical flow (block 302). The optical flow may be determined by Equations 3 and 4, and Equation 10 may be utilized to determine the blur kernel, K.

$$K_p[x,y] = \begin{cases} \dfrac{\delta(-xv_{t+1 \to t}(p) + yu_{t+1 \to t}(p))}{2\tau \|F_{t+1 \to t}(p)\|} & \text{if } (x,y) \in R_1 \\ \dfrac{\delta(-xv_{t-1 \to t}(p) + yu_{t-1 \to t}(p))}{2\tau \|F_{t-1 \to t}(p)\|} & \text{if } (x,y) \in R_2 \\ 0 & \text{otherwise} \end{cases} \qquad \text{Equation 10}$$

where $R_1: x \in [0, \tau u_{t+1 \to t}(p)], y \in [0, \tau v_{t+1 \to t}(p)]$ $R_2: x \in [0, \tau u_{t-1 \to t}(p)], y \in [0, \tau v_{t-1 \to t}(p)]$ and τ is the exposure time. The exposure time may be 1 in some embodiments.

Therefore, the pixel-wise blur kernel estimation process 300 maps optical flows to a blur kernel lookup table to determine weights, wi, to be utilized in bilinear interpolation (block 304). Bilinear interpolation is then used to determine the blur kernel (block 306). Equation 11 may be utilized to perform bilinear interpolation.

$$K(p)[x,y] = \Sigma_{i=1}^N \omega_i(u,v) k_i[x,y] \qquad \text{Equation 11}$$

where N is the range of optical flow over which to compute the blur kernel. The value of N may be set to 33×33, which utilizes from −16 to 16 pixels in both directions. The blur kernel is then utilized by the re-blurrer (block 308) to re-blur the sharpened images.

Figure 4:
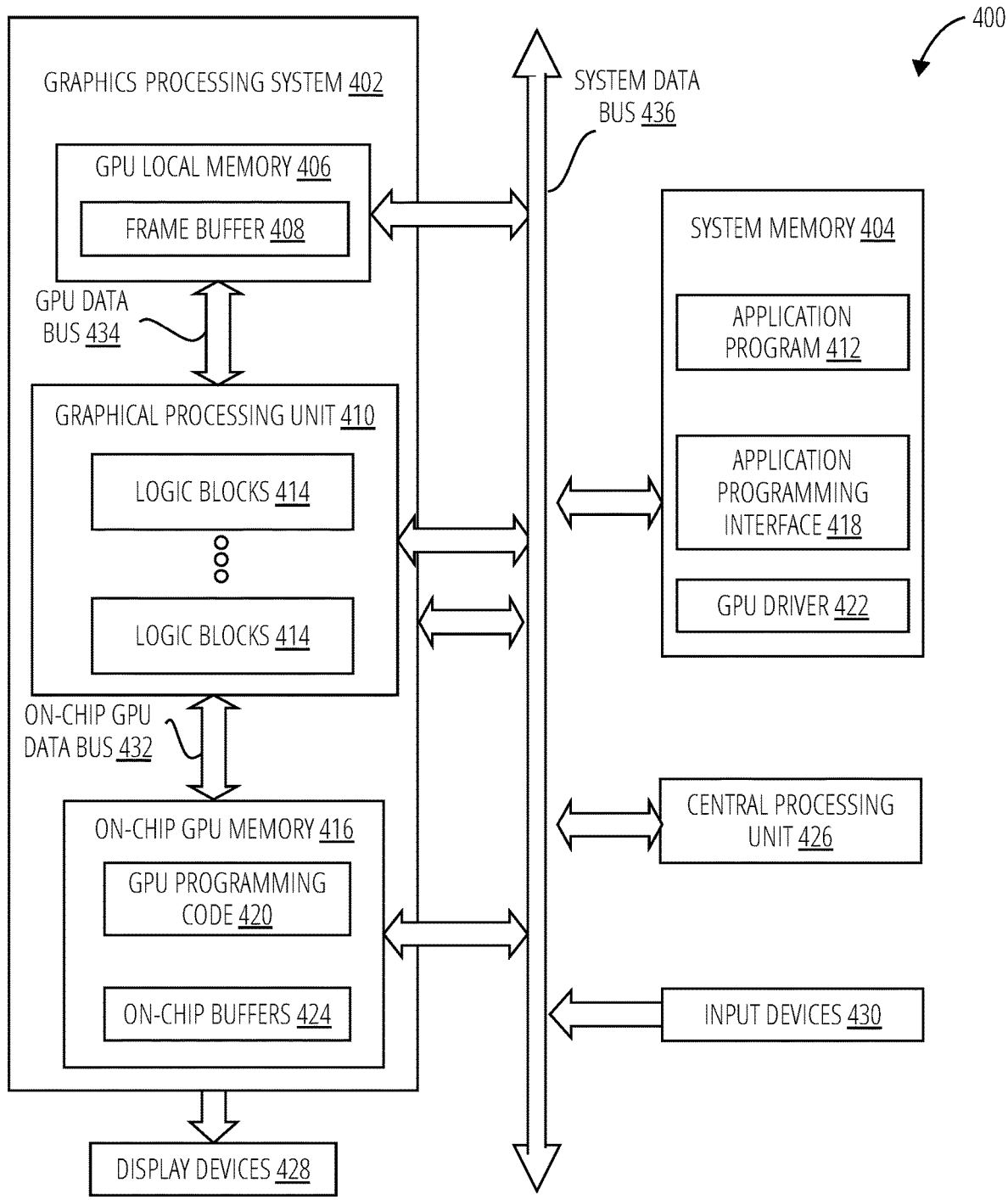
FIG. 4 is a block diagram of a computing system 400 within which the GPU or method introduced herein may be embodied or carried out.

FIG. 4 is a block diagram of one embodiment of a computing system 400 in which one or more aspects of the invention may be implemented. The computing system 400 includes a system data bus 436, a CPU 426, input devices 430, a system memory 404, a graphics processing system 402, and display devices 428. In alternate embodiments, the CPU 426, portions of the graphics processing system 402, the system data bus 436, or any combination thereof, may be integrated into a single processing unit. Further, the functionality of the graphics processing system 402 may be included in a chipset or in some other type of special purpose processing unit or co-processor.

As shown, the system data bus 436 connects the CPU 426, the input devices 430, the system memory 404, and the graphics processing system 402. In alternate embodiments, the system memory 404 may connect directly to the CPU 426. The CPU 426 receives user input from the input devices 430, executes programming instructions stored in the system memory 404, operates on data stored in the system memory 404, and configures the graphics processing system 402 to perform specific tasks in the graphics pipeline. The system memory 404 typically includes dynamic random access memory (DRAM) employed to store programming instructions and data for processing by the CPU 426 and the graphics processing system 402. The graphics processing system 402 receives instructions transmitted by the CPU 426 and processes the instructions to render and display graphics images on the display devices 428.

As also shown, the system memory 404 includes an application program 412, an API 418 (application programming interface), and a graphics processing unit driver 422 (GPU driver). The application program 412 generates calls to the API 418 to produce a desired set of results, for example in the form of a sequence of images. The application program 412 also transmits image processing commands to the API 418 for processing within the graphics processing unit driver 422. The high-level shading programs are typically source code text of high-level programming instructions that are designed to operate the graphics processing system 402. The API 418 functionality is typically implemented within the graphics processing unit driver 422. The graphics processing unit driver 422 is configured to translate the high-level programs into machine code programs that may be optimized for image processing.

The graphics processing system 402 includes a GPU 410 (graphics processing unit), an on-chip GPU memory 416, an on-chip GPU data bus 432, a GPU local memory 406, and a GPU data bus 434. The GPU 410 is configured to communicate with the on-chip GPU memory 416 via the on-chip GPU data bus 432 and with the GPU local memory 406 via the GPU data bus 434. The GPU 410 may receive instructions transmitted by the CPU 426, process the instructions to render graphics data and images, and store these images in the GPU local memory 406. Subsequently, the GPU 410 may display certain graphics images stored in the GPU local memory 406 on the display devices 428.

When operated to sharpen images as described herein, the GPU 410 includes one or more logic blocks 414. The logic blocks 414 include one or more of the processing functions described in conjunction with FIGS. 1-3, especially functions that are graphics-intensive such as generating a blur kernel. The CPU 426 may also provide processing of logic blocks, in conjunction with the GPU 410, to carry out the image processing and training functions described herein. For example, the CPU 426 may process more computationally generic (not graphics intensive) features of the processes, such as aspects of the network training.

The GPU 410 may be provided with any amount of on-chip GPU memory 416 and GPU local memory 406, including none, and may employ on-chip GPU memory 416, GPU local memory 406, and system memory 404 in any combination for memory operations.

The on-chip GPU memory 416 is configured to include GPU programming 420 and on-chip buffers 424. The GPU programming 420 may be transmitted from the graphics processing unit driver 422 to the on-chip GPU memory 416 via the system data bus 436. The on-chip buffers 424 may be employed to store frame data that requires fast access to reduce the latency of the graphics pipeline. Because the on-chip GPU memory 416 takes up valuable die area, it is relatively expensive.

The GPU local memory 406 typically includes less expensive off-chip dynamic random access memory (DRAM) and is also employed to store data and programming employed by the GPU 410. As shown, the GPU local memory 406 includes a frame buffer 408. The frame buffer 408 stores data for at least one two-dimensional surface that may be employed to drive the display devices 428. Furthermore, the frame buffer 408 may include more than one two-dimensional surface so that the GPU 410 can render to one two-dimensional surface while a second two-dimensional surface is employed to drive the display devices 428.

The display devices 428 are one or more output devices capable of emitting a visual image corresponding to an input data signal. For example, a display device may be built using a liquid crystal display, or any other suitable display system. The input data signals to the display devices 428 are typically generated by scanning out the contents of one or more frames of image data that is stored in the frame buffer 408.

Implementations and Interpretation

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Hardware" in this context refers to logic embodied as analog or digital circuitry.

"Software" in this context refers to logic implemented as processor-executable instructions in a machine memory (e.g. read/write volatile or nonvolatile memory or media).

"Firmware" in this context refers to software logic embodied as processor-executable instructions stored in read-only memories or media.

The methods disclosed herein may be embodied in hardware, software, or firmware, or combinations thereof. For example, the methods may be implemented as logic of a computer system, automobile, mobile phone, camera, or other device.

What is claimed is:

1. An image processing method comprising:
   extracting a plurality of consecutive input blurry frames from a video;
   generating a plurality of sharp frames, each of the sharp frames corresponding to one of the input blurry frames;
   determining an optical flow between the sharp frames;
   applying the optical flow to compute a per-pixel blur kernel; and
   applying the blur kernel to reblur each of the sharp frames into a corresponding re-blurred frame.

2. The image processing method of claim 1, wherein:
   generating the sharp frames is performed with a first neural network; and
   generating the optical flow is performed with a second neural network.

3. The image processing method of claim 2, wherein the first neural network is trained using the re-blurred frames.

4. The image processing method of claim 3, wherein the training of the first neural network minimizes a distance between each of the input blurry frames and the corresponding re-blurred frame.

5. The image processing method of claim 3, wherein the training of the first neural network comprises backpropagation of weights derived from both of a determined supervised loss in the re-blurred frames and a determined unsupervised loss in the re-blurred frames.

6. The image processing method of claim 2, wherein the first neural network is one of DVD and DeblurGAN.

7. The image processing method of claim 2, wherein the second neural network is a FlowNetS network.

8. The image processing method of claim 1, wherein the reblur is performed utilizing a precomputed lookup table that maps the optical flow to the blur kernel using bilinear interpolation.

9. The image processing method of claim 1, wherein the reblur is performed using a per-pixel convolution with the blur kernel.

10. The image processing method of claim 9, wherein the blur kernel comprises a pair of piecewise linear line segments per pixel.

11. An image processing apparatus comprising:

a graphics processing unit; and
logic to configure the graphics processing unit to:
  extract a plurality of consecutive input blurry frames from a video;
  generate a plurality of sharp frames, each of the sharp frames corresponding to one of the input blurry frames;
  determine an optical flow between the sharp frames;
  apply the optical flow to compute a per-pixel blur kernel; and
  apply the blur kernel to reblur each of the sharp frames into a corresponding re-blurred frame.

12. The apparatus of claim 11, wherein the logic further configures the graphics processing unit to:
  generate the sharp frames with a first neural network; and
  generate the optical flow with a second neural network.

13. The apparatus of claim 12, further comprising logic to train the first neural network using the re-blurred frames.

14. The apparatus of claim 13, wherein the training of the first neural network minimizes a distance between each of the input blurry frames and the corresponding re-blurred frame.

15. The apparatus of claim 13, wherein the training of the first neural network comprises backpropagation of weights derived from both of a determined supervised loss in the re-blurred frames and a determined unsupervised loss in the re-blurred frames.

16. The apparatus of claim 12, wherein the first neural network is one of DVD and DeblurGAN.

17. The apparatus of claim 12, wherein the second neural network is a FlowNetS network.

18. The apparatus of claim 11, wherein the reblur is performed utilizing a precomputed lookup table that maps the optical flow to the blur kernel using bilinear interpolation.

19. The apparatus of claim 11, wherein the reblur is performed using a per-pixel convolution with the blur kernel.

20. The apparatus of claim 19, wherein the blur kernel comprises a pair of piecewise linear line segments per pixel.

* * * * *